United States Patent
Middleburgh et al.

(10) Patent No.: US 11,315,695 B2
(45) Date of Patent: Apr. 26, 2022

(54) CERAMIC NUCLEAR FUEL HAVING UB2 ENRICHED IN 11B

(71) Applicant: WESTINGHOUSE ELECTRIC SWEDEN AB, Västerås (SE)

(72) Inventors: Simon Middleburgh, Chester (GB); Lars Hallstadius, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 109 days.

(21) Appl. No.: 16/605,413

(22) PCT Filed: Mar. 16, 2018

(86) PCT No.: PCT/EP2018/056716
§ 371 (c)(1),
(2) Date: Oct. 15, 2019

(87) PCT Pub. No.: WO2018/197105
PCT Pub. Date: Nov. 1, 2018

(65) Prior Publication Data
US 2021/0125734 A1     Apr. 29, 2021

(30) Foreign Application Priority Data
Apr. 26, 2017   (EP) .................................... 17168130

(51) Int. Cl.
*G21C 3/62* (2006.01)
*C04B 35/515* (2006.01)
(Continued)

(52) U.S. Cl.
CPC ............ *G21C 3/62* (2013.01); *C04B 35/5158* (2013.01); *C04B 35/5805* (2013.01); *G21C 3/42* (2013.01);
(Continued)

(58) Field of Classification Search
CPC .... G21C 3/62; G21C 3/42; G21C 3/18; C04B 35/5158; C04B 35/5805; C04B 2235/3804
See application file for complete search history.

(56) References Cited

U.S. PATENT DOCUMENTS

| | | | |
|---|---|---|---|
| 3,575,874 A | 4/1971 | Sullenger | |
| 2006/0285627 A1* | 12/2006 | Lahoda | G21C 3/62 376/419 |

(Continued)

FOREIGN PATENT DOCUMENTS

| | | |
|---|---|---|
| EP | 1647993 A2 | 4/2006 |
| JP | 200629797 A | 2/2006 |
| WO | 2006096505 A2 | 9/2006 |

OTHER PUBLICATIONS

Marshall, "A Review of Gas-Cooled Reactor Concepts for SDI Applications" (1989). (Year: 1989).*

(Continued)

*Primary Examiner* — Jack W Keith
*Assistant Examiner* — Daniel Wasil
(74) *Attorney, Agent, or Firm* — Murtha Cullina LLP

(57) ABSTRACT

A fuel assembly for a nuclear reactor, a fuel rod of the fuel assembly, and a ceramic nuclear fuel pellet of the fuel rod are disclosed. The fuel pellet includes a first fissile material of $UB_2$. The boron of the $UB_2$ is enriched to have a concentration of the isotope $^{11}B$ that is higher than for natural B.

12 Claims, 1 Drawing Sheet

(51) Int. Cl.
  *C04B 35/58* (2006.01)
  *G21C 3/42* (2006.01)
  *G21C 3/18* (2006.01)
(52) U.S. Cl.
  CPC ........ *C04B 2235/3804* (2013.01); *G21C 3/18* (2013.01)

(56) References Cited

U.S. PATENT DOCUMENTS

2008/0031398 A1    2/2008  Lahoda et al.
2020/0234833 A1*   7/2020  Middleburgh ......... G21C 3/623

OTHER PUBLICATIONS

Mcclellan, FY2014 Ceramic Fuels Development Annual Highlights. No. LA-UR-14-27363. Los Alamos National Lab (2014). (Year: 2014).*
International Search Report issued in corresponding PCT Application No. PCT/EP2018/056716, dated Jul. 10, 2018, pp. 1-2.
International Preliminary Report on Patentability issued in corresponding PCT Application No. PCT/EP2018/056716, dated Nov. 7, 2019, pp. 1-10.
Brown et. al. "Neutronic performance of uranium nitride composite fuels in a PWR", Nuclear Engineering and Design 275, 2014, pp. 393-407.
A.C. Marshall, "A Review of Gas-Cooled Reactor Concepts for SDI Applications," Sandia Report, 1989, pp. 1-155.
"Advanced Fuel Pellet Materials and Fuel Rod Design for Wwater Cooled Reactors," IAEA-TECDOC-1654, 2010, pp. 1-242.

* cited by examiner

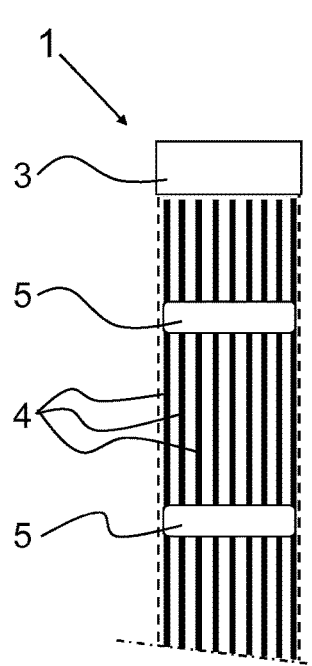
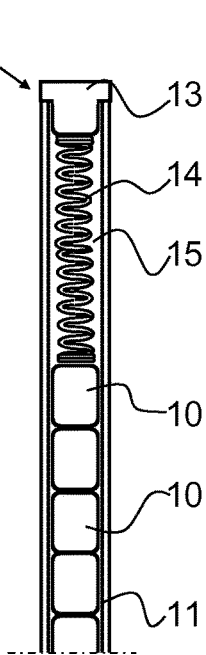
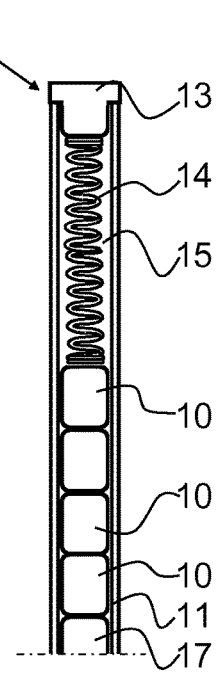
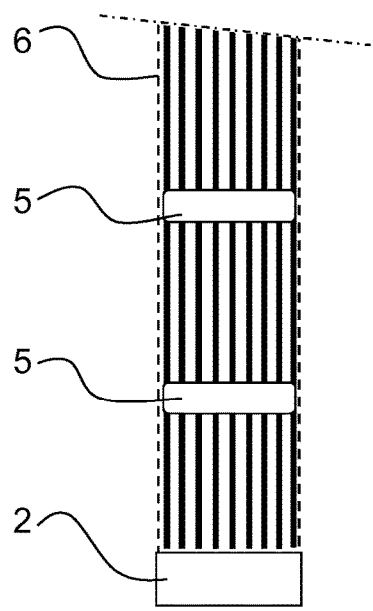
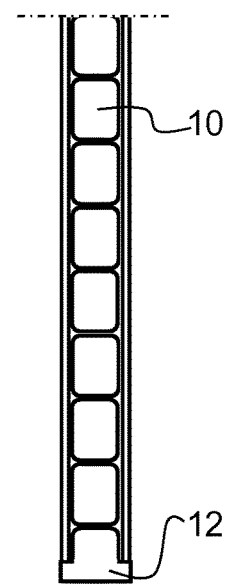
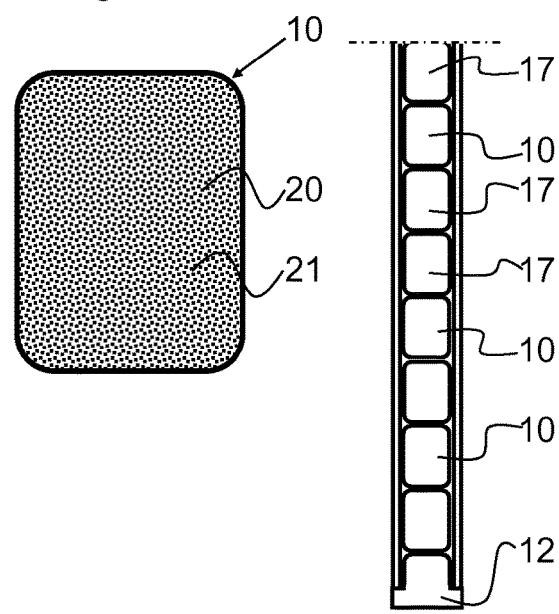

CERAMIC NUCLEAR FUEL HAVING UB2 ENRICHED IN 11B

TECHNICAL FIELD OF THE INVENTION

The present invention refers to a ceramic nuclear fuel pellet for a nuclear reactor, wherein the nuclear fuel pellet comprises a first fissile material of $UB_2$. The invention also refers to a fuel rod comprising a cladding tube and a plurality of nuclear fuel pellets, and to a fuel assembly comprising a plurality of fuel rods.

BACKGROUND AND PRIOR ART

The dominant nuclear fuel used today comprises sintered nuclear fuel pellets of uranium dioxide, $UO_2$. Uranium dioxide is an excellent nuclear fuel having a melting point of 2865° C. However, there is a demand for improvements in certain respects. An increase of the uranium density, would improve the economy of the fuel. An increase of the thermal conductivity, would improve the in reactor behavior of the pellet and thus make it more suitable for the next generation reactors, providing attributes that may be amenable to so called accident tolerant fuels, ("ATF").

US 2008/031398 discloses a plurality fuel rods containing different compositions of fuel elements with actinide fuel only, and fuel elements with actinide fuel and boron compounds, for instance $UB_2$. The purpose of the boron compounds is to absorb neutrons, and thus the boron may be natural or enriched to increase the concentration of the isotope $^{10}B$.

EP 1 647 993 discloses a fuel assembly comprising at least one fuel pellet with a sintered mixture of actinide fuel and a boron-containing compound, for instance $UB_2$. The boron may be natural boron or enriched boron with a higher concentration of the isotope $^{10}B$.

Brown et. al. "Neutronic performance of uranium nitride composite fuels in a PWR", refers to an investigation of possible future nuclear fuels. One of the fuels is the composite fuel $UN/UB_4$. The boron content of $UB_4$ is 100% enriched in $^{11}B$.

SUMMARY OF THE INVENTION

An object of the present invention is to provide an alternative nuclear fuel. In particular, it is aimed at a nuclear fuel that would meet the requirements of so called accident tolerant fuels, ATF.

This object is achieved by the nuclear fuel pellet initially defined, which is characterized in that the boron of the $UB_2$ is enriched to contain a concentration of the isotope $^{11}B$ that is higher than for natural B.

The boron isotope $^{11}B$ has a very small neutron cross section, i.e. small absorption of neutrons. The neutron cross section of the boron isotope $^{11}B$ is 0.0055 barns compared to 3835 barns for the boron isotope $^{10}B$ and 767 barns for natural boron.

The nuclear fuel pellet comprising or consisting fissile material of $UB_2$ enriched in such a way may thus ensure a high efficiency since a higher percentage of the neutrons may be used in the fission process.

$UB_2$ is a ceramic with a melting point of >2400° C., and therefore considered to be an ultra-high temperature ceramic, UTHC. The nuclear fuel pellet comprising or consisting of a fissile material of $UB_2$ may thus withstand very high temperatures, which makes it suitable as an accident tolerant fuel, especially when coupled with its superior thermal conductivity compared to $UO_2$.

$UB_2$ has a density of approximately 12.74 $g/cm^3$ and a uranium density of 11.66 $g/cm^3$. The nuclear fuel pellet comprising or consisting of $UB_2$ may thus ensure a high efficiency of the fission process. This is a significant improvement compared to $UO_2$ which has a density of approximately 10.9 $g/cm^3$ and a uranium density of 9.7 $g/cm^3$.

$UB_2$ is relatively stable in contact with water and the reaction of $UB_2$ with water does not proceed rapidly, at least not until above 600° C. in water and 400° C. in air, without dopants.

Swelling of $UB_2$ during operation is moderate. The nuclear fuel pellet comprising or consisting of $UB_2$ may thus be suitable to be contained in an unconventional cladding tube of for instance a silicon carbide structure proposed as a cladding for accident tolerant fuels.

According to an embodiment of the invention, the concentration of the isotope $^{11}B$ is at least 85% by weight. The natural concentration of the isotope $^{11}B$ is approximately 80% by weight.

According to an embodiment of the invention, the concentration of the isotope $^{11}B$ is at least 90% by weight.

According to an embodiment of the invention, the concentration of the isotope $^{11}B$ is at least 95% by weight.

According to an embodiment of the invention, the concentration of the isotope $^{11}B$ is approximately 100% by weight.

According to an embodiment of the invention, the nuclear fuel pellet consists of $UB_2$. The technical advantages discussed above will be achieved with a nuclear fuel pellet comprising $UB_2$ as the sole component.

According to an embodiment of the invention, the nuclear fuel pellet comprises a second fissile material. The technical advantages discussed above may also be achieved with a nuclear fuel pellet comprising a second fissile material in addition to the first fissile material of $UB_2$. The concentration of the second fissile material may vary depending on the position of the nuclear fuel pellet in the fuel rod. For instance, the concentration of the second fissile material may be at least 99.9%, at least 90%, at least 80%, at least 70%, at least 60%, at least 50% or 40% by volume. Furthermore, the concentration of the second fissile material may be at most 40%, at most 30%, at most 20%, at most 10% or at most 5% by volume.

According to an embodiment of the invention, the at least one second fissile material comprises one of an actinide nitride, an actinide silicide and an actinide oxide.

According to an embodiment of the invention, the at least one second fissile material comprises one of UN, $U_3Si_2$, $UO_2$, $U_3Si$, USi, PuN, $Pu_3Si_2$, $PuO_2$, $Pu_3Si$, PuSi, ThN, $Th_3Si_2$, $ThO_2$, $Th_3Si$ and ThSi.

According to an embodiment of the invention, the at least one second fissile material comprises $UB_x$, and wherein x is larger than 2, for instance $UB_4$. This embodiment creates a possibility to tailor the neutron absorbing capability by adjusting the boron content of the nuclear fuel pellet without varying the boron enrichment within the nuclear fuel pellet or the fuel rod.

According to an embodiment of the invention, the first fissile material and the at least one second fissile material are mixed in the nuclear fuel pellet.

According to an embodiment of the invention, the nuclear fuel pellet is a sintered nuclear fuel pellet.
}

The object is also achieved by the initially defined fuel rod comprising a cladding tube and a plurality of nuclear fuel pellets according to any one of the embodiments defined above.

According to an embodiment of the invention, the fuel rod comprises a plurality of absorbing pellets comprising $UB_2$, in which the boron of the $UB_2$ has a concentration of the isotope $^{10}B$ that is higher than in the $UB_2$ of the first fissile material of the nuclear fuel pellets. The fuel rod may thus comprise both nuclear fuel pellets and absorbing pellets. The absorbing pellets may be tailored to act as a burnable poison in the fuel rod, for improving the economy and the utilization of the fuel in the nuclear reactor.

According to an embodiment of the invention, the concentration of the isotope $^{10}B$ in the $UB_2$ of the absorbing pellets is at least 25, 30, 40, 50, 60, 70, 80, 90 or 100% by weight.

The object is also achieved by the initially defined fuel assembly comprising a plurality of fuel rods as defined above. The fuel assembly may comprise fuel rods comprising nuclear fuel pellets, and fuel rods comprising absorbing pellets.

BRIEF DESCRIPTION OF THE DRAWINGS

The invention is now to be explained more closely through a description of various embodiments and with reference to the drawings attached hereto.

FIG. 1 discloses schematically a longitudinal sectional view of a fuel assembly for a nuclear reactor.

FIG. 2 discloses schematically a longitudinal sectional view of a fuel rod of the fuel assembly in FIG. 1.

FIG. 3 discloses longitudinal sectional view of a nuclear fuel pellet according to a first embodiment and suitable for being contained the fuel rod in FIG. 2.

FIG. 4 discloses longitudinal sectional view of a nuclear fuel pellet according to a second embodiment and suitable for being contained the fuel rod in FIG. 2.

FIG. 5 discloses schematically a longitudinal sectional view of another fuel rod suitable for the fuel assembly shown in FIG. 1.

DETAILED DESCRIPTION

FIG. 1 discloses a fuel assembly 1 configured to be introduced into a core of a nuclear reactor, in particular in a water cooled light water reactors, LWR, such as a Boiling Water Reactor, BWR, or a Pressurized Water reactor, PWR. The core may comprise or consist of high burnup areas and low burnup areas.

The fuel assembly 1 comprises a bottom member 2, a top member 3 and a plurality of elongated fuel rods 4 extending between the bottom member 2 and the top member 3. The fuel rods 4 are maintained in their positions by means of a plurality of spacers 5.

Furthermore, the fuel assembly 1 may, for instance when to be used in a BWR, comprise a flow channel or fuel box indicated by dashed lines 6 and surrounding the fuel rods 4.

FIG. 2 discloses one of the fuel rods 4 of the fuel assembly 1 of FIG. 1. The fuel rod 4 comprises a nuclear fuel in the form of a plurality of nuclear fuel pellets 10, and a cladding tube 11 enclosing the nuclear fuel pellets 10. The fuel rod 4 comprises a bottom plug 12 sealing a lower end of the cladding tube 11, and a top plug 13 sealing an upper end of the fuel rod 4. The nuclear fuel pellets 10 are arranged in a pile in the cladding tube 11. The cladding tube 11 thus encloses the fuel pellets 10 and a gas.

A spring 14 is arranged in an upper plenum 15 between the pile of nuclear fuel pellets 10 and the top plug 13. The spring 14 compresses the pile of nuclear fuel pellets 10 against the bottom plug 12.

A first embodiment of one of the nuclear fuel pellets 10 is disclosed in FIG. 3. The nuclear fuel pellet 10 is a ceramic nuclear fuel pellet 10 and comprises, or consists of, a first fissile material of $UB_2$.

A second embodiment of one of the nuclear fuel pellets 10 is disclosed in FIG. 4, according to which the ceramic nuclear fuel pellet 10, in addition to the first fissile material 20, may comprise at least one second fissile material 21. The concentration of the second fissile material 21 may vary depending on the position of the nuclear fuel pellet in the fuel rod, or in the fuel assembly.

In low burnup areas, for instance in the lower region of the core of the nuclear reactor, the concentration of the second fissile material may be relatively high and in high burnup areas of the core, where the temperature is expected to be higher, the concentration of the second fissile material may be relatively low.

For instance, the concentration of the second fissile material may be 99.9%, at least 90%, at least 80%, at least 70%, at least 60%, at least 50% or at least 40% by volume in low burnup areas. In high burnup areas, the concentration of the second fissile material 21 may be at most 40%, at most 30%, at most 20%, at most 10% or at most 5% by volume.

At least in high burnup areas, the first fissile material 20 may thus constitute the main fissile material, and the second fissile material 21 the minor fissile material.

The at least one second fissile material 21 comprises one of an actinide nitride, an actinide silicide and an actinide oxide. In the embodiments disclosed, the second fissile material 21 comprises no boron.

For instance, the at least one second fissile material 21 may comprise one of UN, $U_3Si_2$, $UO_2$, $U_3Si$, USi, PuN, $Pu_3Si_2$, $PuO_2$, $Pu_3Si$, PuSi, ThN, $Th_3Si_2$, $ThO_2$, $Th_3Si$ and ThSi.

Furthermore, the at least one second fissile material 21 may comprise $UB_x$, wherein x is larger than 2, for instance $UB_4$. Such a $UB_x$ compound offers a possibility to increase the neutron absorbing capability of all or some of the nuclear fuel pellets 10 in the fuel rod 4.

The first fissile material 20 and the at least one second fissile material 21, or second fissile materials 21, may be intimately mixed in the nuclear fuel pellet 10.

In the nuclear fuel pellet 10 of the first and second embodiments, the boron of the $UB_2$ is enriched to contain a concentration of the isotope $^{11}B$ that is higher than for natural B. The concentration of the isotope $^{11}B$ may be at least 85% by weight, preferably at least 90% by weight, more preferably at least 95% by weight or most preferably approximately 100%, or 100%, by weight.

These concentrations constitute an enrichment compared to the natural concentration of the isotope $^{11}B$, which is approximately 80% by weight.

The ceramic nuclear fuel pellet 10 may be a sintered nuclear fuel pellet. A powder of the first fissile material, and possible a powder of the second fissile material or materials, may be mixed to form a mixture. The mixture is compressed to a green body, which is then sintered in suitable oven to the nuclear fuel pellet 10.

The nuclear fuel pellet 10 may also as an alternative be manufactured in other ways, for instance through casting or extrusion.

FIG. 5 discloses another fuel rod 4, which differs from the fuel rod 4 in FIG. 2 in that it in addition to the nuclear fuel pellets 10 also comprises a plurality of absorbing pellets 17, for instance 20, 40, 60, 80 or 100% absorbing pellets 17, the remaining pellets being nuclear fuel pellets 10.

Also the absorbing pellets 17 comprises $UB_2$. However, in the absorbing pellets 17, the boron of the $UB_2$ has a concentration of the isotope $^{10}B$ that is higher than in the $UB_2$ of the first fissile material of the nuclear pellets 10.

The concentration of the isotope $^{10}B$ in the $UB_2$ of the absorbing pellets 17 may be at least 25, 30, 40, 50, 60, 70, 80, 90 or 100% by weight.

The absorbing pellets 17 may also comprise $UB_2$ as a first fissile material and possibly at least one second fissile material as described above.

The present invention is not limited to the embodiments disclosed and described herein, but may be varied and modified within the scope of the following claims.

What is claimed is:

1. A ceramic nuclear fuel pellet for a nuclear reactor, wherein the nuclear fuel pellet comprises a first fissile material of $UB_2$, wherein the boron of the $UB_2$ is enriched to have a concentration of the isotope $^{11}B$ that is higher than for natural B, wherein the concentration of the isotope $^{11}B$ is at least 85% by weight,
wherein the nuclear fuel pellet further comprises at least one second fissile material, the at least one second fissile material comprises UN.

2. The ceramic nuclear fuel pellet according to claim 1, wherein the concentration of the isotope $^{11}B$ is at least 90% by weight.

3. The ceramic nuclear fuel pellet according to claim 1, wherein the concentration of the isotope $^{11}B$ is at least 95% by weight.

4. The ceramic nuclear fuel pellet according to claim 1, wherein the concentration of the isotope $^{11}B$ is at approximately 100% by weight.

5. The ceramic nuclear fuel pellet according to claim 1, wherein the nuclear fuel pellet consists of $UB_2$.

6. The ceramic nuclear fuel pellet according to claim 1, wherein the at least one second fissile material comprises one of an actinide nitride, an actinide silicide and an actinide oxide.

7. The ceramic nuclear fuel pellet according to claim 1, wherein the first fissile material and the at least one second fissile material are mixed in the nuclear fuel pellet.

8. The ceramic nuclear fuel pellet according to claim 1, wherein the nuclear fuel pellet is a sintered nuclear fuel pellet.

9. A fuel rod comprising a cladding tube and a plurality of nuclear fuel pellets according to claim 1.

10. The fuel rod according to claim 9, wherein the fuel rod comprises a plurality of absorbing pellets comprising $UB_2$, in which the boron of the $UB_2$ has a concentration of the isotope $^{10}B$ that is higher than in the $UB_2$ of the first fissile material of the nuclear fuel pellets.

11. The fuel rod according to claim 10, wherein the concentration of the isotope $^{10}B$ in the $UB_2$ of the absorbing pellets is at least 25, 30, 40, 50, 60, 70, 80, 90 or 100% by weight.

12. A fuel assembly comprising a plurality of fuel rods according to claim 9.

\* \* \* \* \*